Jan. 13, 1959
C. F. INNISS
2,868,969
DIODE SHUNT GATING CIRCUIT
Filed April 22, 1953
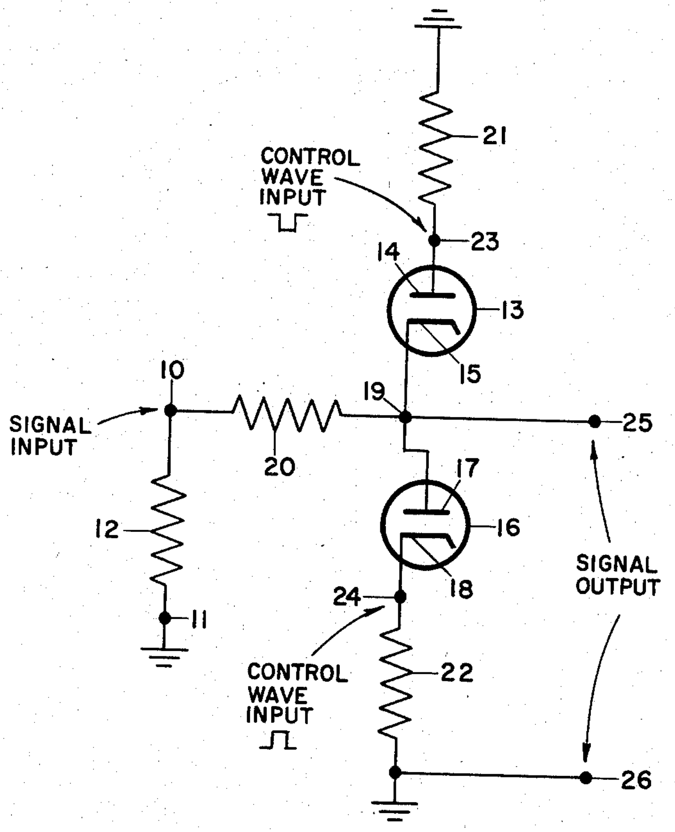
INVENTOR.
CLARENCE F. INNISS
BY [signature]
ATTORNEYS United States Patent Office 2,868,969
Patented Jan. 13, 1959

2,868,969

DIODE SHUNT GATING CIRCUIT

Clarence F. Inniss, Oxnard, Calif., assignor to the United States of America as represented by the Secretary of the Navy Application April 22, 1953, Serial No. 350,538
1 Claim. (Cl. 250—27)
(Granted under Title 35, U. S. Code (1952), sec. 266)

The invention described herein may be manufactured and used by or for the Government of the United States of America for governmental purposes without the payment of any royalties thereon or therefor.

The present invention relates to a gating circuit and more particularly to a gating circuit employing a plurality of diodes adapted to have control signals impressed upon components thereof to selectively cause the diodes to becomee electrically nonconductive.

The present invention may be utilized for gating any type of signal but it is particularly adapted to gate sine wave and low-frequency complex signals and will pass such signals to the output of the circuit without distortion of the wave shape of the input signal. In prior art gating circuits, the control signal which governs the gating action of the circuit appears at an output terminal thereof, creating undesirable gating transients which must be eliminated from the output signal to maintain the desired output wave shape.

Prior art gating circuits are provided with means for making fine balance adjustments therein to eliminate gating transients, and these adjustments are quite critical thereby necessitating frequent alteration thereof to compensate for variations in operating conditions. In known circuits, a high voltage power supply is required to the plates of the gating tubes, and the gating ratio, i. e. the ratio of the output voltage when the "gate" is open to that when the "gate" is closed, is dependent on the magnitude of the control signal applied to the tube. Therefore, the magnitude of the control must be carefully adjusted to obtain the desired ratio.

The present invention utilizes an arrangement wherein the control signal is isolated from the input and output signals due to the inherent operation of certain components of the circuit thereby preventing the control signal from appearing at an output terminal of the circuit. No balance adjustments are necessary since the circuit prevents "gating transients" from distorting the output wave shape. There is no requirement for a high voltage power supply to any of the components of the gating tubes in the invention circuit, and the gating ratio thereof is independent of the magnitude of the control signal, thereby eliminating the requirement for careful adjustment of the control signal.

An object of the present invention is the provision of a new and novel gating circuit which eliminates gating transients, and distortion of the output signal.

Another object is to provide a gating circuit which requires no balance adjustments.

A further object of the invention is the provision of a gating circuit in which the gating ratio is independent of the magnitude of the control signal.

Still another object is to provide a gating circuit which requires no high voltage power supply to any of the components of the gating tubes in the circuit.

Yet another object is the provision of a gating circuit which is simple and inexpensive in construction and employs a minimum of parts, yet is efficient and reliable in operation.

Other objects and many of the attendant advantages of this invention will be readily appreciated as the same becomes better understood by reference to the following detailed description when considered in connection with the accompanying drawing showing a schematic diagram of a preferred embodiment of the invention.

In the following description and claim, the term "connected" is used to designate an electrical connection between various components of the circuit, including an electrical connection through ground. Referring now to the drawing, there is shown two input terminals 10 and 11 across which an input signal is impressed. The input signal may originate at any suitable source such as a transformer, or the plate of a tube and the like. Terminal 11 is connected to ground and a resistor 12 is connected between terminals 10 and 11, the resistor serving as a suitable terminating load for the source of the signals impressed on the input terminals. Resistor 12 may be eliminated from the circuit if the source of the input signals provides a suitable terminating load. A diode 13 is provided with an anode 14 and a cathode 15, and a diode 16 is provided with an anode 17 and a cathode 18. These two diodes may be separate tubes as shown, or may be in the form of a conventional double-diode tube. Cathode 15 is connected to anode 17 at terminal 19 which is connected to input terminal 10 through a resistor 20.

Anode 14 is connected to ground through resistor 21 and cathode 18 is connected to ground through resistor 22. A control signal or voltage is applied to anode 14 at terminal 23, and a control voltage is applied to cathode 18 at terminal 24. An output terminal 25 is connected in series with terminals 10, 19 and resistor 20, and an output terminal 26 is connected to ground. Output terminals 25 and 26 are terminated in a high impedance and may be connected for example so as to impress the output voltage upon the grid of a vacuum tube amplifier or the like.

It is evident that the positive portion of the input signal will flow through resistor 20, diode 16 and resistor 22, and the negative portion of the input signal will follow through resistor 20, diode 13 and resistor 21 when no control voltages are supplied at terminals 23 and 24. The ratio of the amplitude of the positive portion of the signal appearing across output terminals 25 and 26 to the amplitude of the positive portion of the input signal will equal the ratio of the resistance of resistor 22 plus the forward resistance of tube 16 to the resistance of resistor 22 plus the forward resistance of diode 16 plus the resistance of resistor 20. The ratio of the amplitude of the negative portion of the signal appearing across the output terminals to the amplitude of the negative portion of the input signal will equal the ratio of the resistance of resistor 21 plus the forward resistance of diode 13 to the resistance of resistor 21 plus the forward resistance of diode 13 plus the resistance of resistor 20.

When diodes 13 and 16 are electrically conductive, the "gate" is closed and the amplitude of the signal appearing across output terminals 25 and 26 must be substantially less than that appearing across the input terminals 10 and 11 to provide a suitable gating action. The forward resistance of diodes 13 and 16 is equal, and the resistance of resistors 21 and 22 is equal. The resistance of resistors 21 and 22 is sufficiently large to make the forward resistance of diodes 13 and 16 insignificant, and therefore the resistance of resistor 20 must be substantially greater than that of resistors 21 and 22 in order to make the amplitude of the signal appearing across terminals 25 and 26 sufficiently small. For example, the values of resistors 21 and 22 may be on the order of 5,000 ohms, and the value of resistor 20 may be on the order of 250,000 ohms.

As pointed out previously, the "gate" is closed when diodes 13 and 16 are electrically conductive; however, these tubes may be made nonconductive by applying control voltages of suitable polarity and magnitude to terminals 23 and 24. A negative control voltage, the amplitude of which is equal to or greater than one-half the maximum peak to peak input voltage across terminals 10 and 11 is applied to terminal 23 and thereby prevents diode 13 from conducting the negative portion of the input signal. A positive control voltage, the magnitude of which is as great or greater than one-half the maximum peak to peak value of the input voltage is applied to terminal 24 and prevents tube 16 from conducting the positive portion of the input signal. Therefore, the input signal will not be conducted through either of the diodes and will appear across the output terminals 25 and 26 when the control voltages are applied to the circuit.

Since tubes 13 and 16 become nonconductive upon application of the control voltages to terminals 23 and 24, these voltages are isolated from the output signal and no "gating transients" are created, whereby the input signal appears across the output terminals without any distortion in wave shape. In order to maintain the "gate" completely open, the magnitude of the control voltages applied to terminals 23 and 24 must be at least one-half that of the maximum peak to peak input voltage applied across terminals 10 and 11, but the control voltages may be of any magnitude greater than this minimum value and need not be carefully adjusted.

Since the output of the circuit is terminated in a very high impedance, there will be very little voltage drop across resistor 20, and consequently the input signal will be passed substantially undiminished in magnitude to the output when the "gate" is open.

As pointed out previously, tubes 13 and 16 are nonconductive and the "gate" is open when the control voltages are applied to terminals 23 and 24. The "gate" may then be closed by removing the control voltages from terminals 23 and 24. Therefore, the "gate" may be selectively opened or closed by applying or removing the control voltages at terminals 23 and 24. Any suitable means may be employed to selectively apply and remove the control voltages such as a conventional flip-flop stage, a one-shot multivibrator or the like.

No additional high voltage power supply is required to any of the components of the tubes in the invention circuit, and the controlling voltages applied at 23 and 24 provide the only additional source of electrical energy to the circuit besides that of the input signal. The source of control voltages is completely independent of the source of the input signals and is unaffected by any changes in magnitude of the input signal. Since the control signals are completely isolated from the output of the circuit, the necessity of balance adjustments is eliminated. The gating ratio of the circuit may be adjusted by simply varying the resistance of resistor 20 or resistors 21 and 22. This may be most simply accomplished either by providing a rheostat arrangement on resistor 20, or by replacing resistor 20 with a resistor of a different value. Impedance means 20—22 may also include combinations of resistors and reactive elements, and although it is preferred to employ either resistors or combinations of resistors and reactive elements, impedance means 20—22 may consist of purely reactive elements such as capacitors or inductors.

It is apparent from the foregoing that there is provided a new and novel gating circuit which requires no balance adjustments or high voltage power supply to components of the gating tubes thereof and which eliminates gating transients and distortion of the output signal. The gating ratio of the circuit is independent of the magnitude of the control signals applied thereto, and the circuit is simple and inexpensive in construction and employs a minimum of parts, yet is efficient and reliable in operation.

Obviously many modifications and variations of the present invention are possible in the light of the above teachings. It is therefore to be understood that within the scope of the appended claim the invention may be practiced otherwise than as specifically described.

I claim:

A precise gating circuit for controlling the passage of an input signal in accordance with an applied control wave of substantially rectangular configuration, the said gating action occurring at precisely-determined instants of time regardless of the polarity and magnitude of the said input signal, said circuit comprising a resistive impedance, a pair of diodes, means for applying said input signal through said impedance to the anode of one of said diodes and to the cathode of the other of said diodes, a pair of equivalent resistors each of which is of a substantially lower value than that of said impedance, means connecting the cathode of said one diode to ground through one of said resistors, means connecting the anode of said other diode to ground through the remaining one of said resistors, and means for concurrently applying to the cathode of said one diode and to the anode of said other diode a control wave of substantially rectangular configuration and of bidirectional polarity which is effective to simultaneously render both said diodes electrically nonconductive during one excursion of polarity of said control wave, said control wave being independent of said input signal and having an equal amplitude in each direction of polarity at least as great as the maximum peak-to-peak amplitude of the input signal as applied to said diodes, said control wave acting to preclude conductivity of both of said diodes during the period of its application in its said one excursion of polarity.

References Cited in the file of this patent

UNITED STATES PATENTS

| | | |
|---|---|---|
| 2,144,995 | Pulvari-Pulvermacher | Jan. 24, 1939 |
| 2,438,947 | Rieke et al. | Apr. 6, 1948 |
| 2,443,195 | Pensyl | June 15, 1948 |
| 2,564,017 | Maggio | Aug. 14, 1951 |
| 2,597,796 | Hindall | May 20, 1952 |

OTHER REFERENCES

Waveforms, Radiation Lab. Series, McGraw-Hill Book Co., New York, vol. 19, pages 371–375, 396–401.